Figure 1:
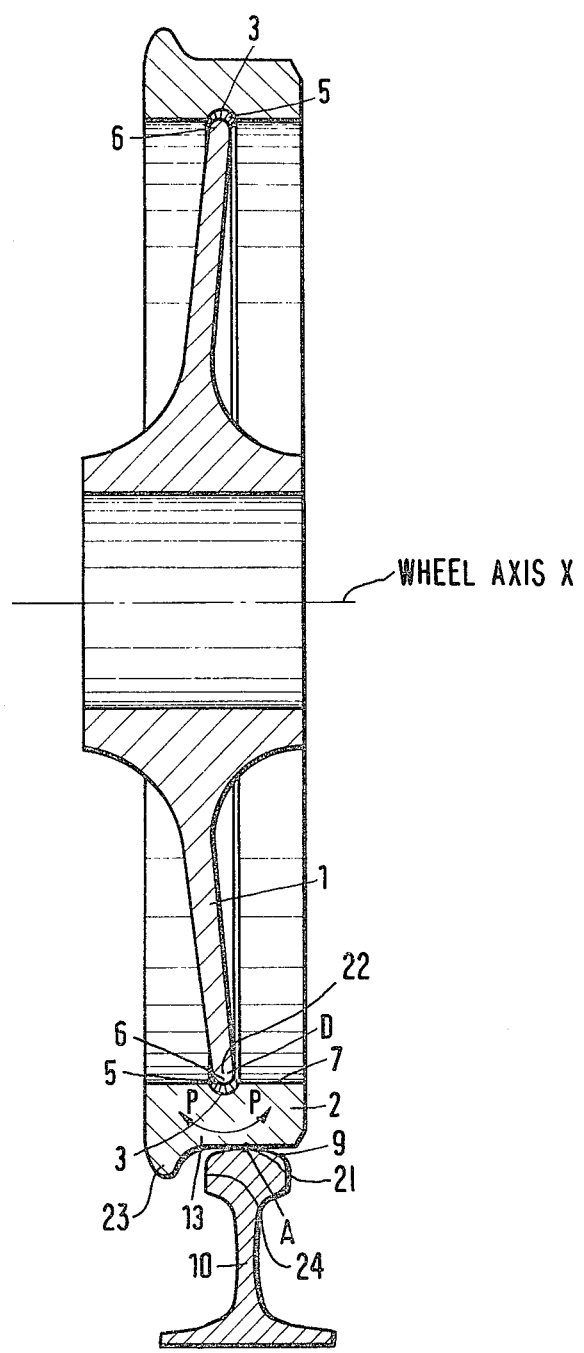

United States Patent [19]

Brauer

[11] 4,318,564
[45] Mar. 9, 1982

[54] RAILWAY CAR WHEEL

[75] Inventor: Hans-Martin Brauer, Mögglingen, Fed. Rep. of Germany

[73] Assignee: Schwäbische Hüttenwerke Gesellschaft mit beschränkter Haftung, Aalen-Wasseralfingen, Fed. Rep. of Germany

[21] Appl. No.: 950,591

[22] Filed: Oct. 12, 1978

[30] Foreign Application Priority Data

Oct. 15, 1977 [DE] Fed. Rep. of Germany ....... 2746407

[51] Int. Cl.$^3$ .......................... B60B 3/04; B60B 9/12; B60B 17/00; B60B 21/00
[52] U.S. Cl. ......................................... 295/11; 295/7; 295/10; 295/14; 295/15; 295/21; 295/44
[58] Field of Search ................... 295/7, 11, 12, 13, 14, 295/15, 21, 1, 9, 1 D, 3 D, 34, 43, 44, 10

[56] References Cited

U.S. PATENT DOCUMENTS

| 180,247 | 7/1876 | Levake | 295/10 |
|---|---|---|---|
| 990,038 | 4/1911 | Eustis | 295/10 |
| 1,982,043 | 11/1934 | Brownyer | 295/11 |
| 2,113,379 | 4/1938 | Maas | 295/11 |
| 3,127,211 | 3/1964 | Kordes et al. | 295/11 |
| 3,756,646 | 9/1973 | Gimlett et al. | 295/7 |
| 3,915,490 | 10/1975 | Ranger et al. | 295/21 |

FOREIGN PATENT DOCUMENTS

564514 11/1932 Fed. Rep. of Germany ........ 295/14

OTHER PUBLICATIONS

Anton Nefzger, Verhalten von Rad und Schiene bei hohen Geschwindigkeiten, ZEV-Glas. Ann. 103 (1979) Nr. 2/3 Feb., März, pp. 57-68.

*Primary Examiner*—Joseph F. Peters, Jr.
*Assistant Examiner*—Howard Beltran
*Attorney, Agent, or Firm*—Becker & Becker, Inc.

[57] ABSTRACT

A wheel for rail vehicles with at least one disc which is connected to an axle, and with a wheel rim having a tread or surface surrounding the disc, while the rail tread in engagement with the rim tread results in contacting points of the wheel during straight forward drive of the vehicle located on the tread or track of the rails. At least within that region of the rim which contains the above mentioned rail contacting points of the wheel rim the wheel rim is turnably connected to the disc for turning about an imaginary axis located in about the driving direction of the wheel.

13 Claims, 5 Drawing Figures

Fig. 2
Fig. 3
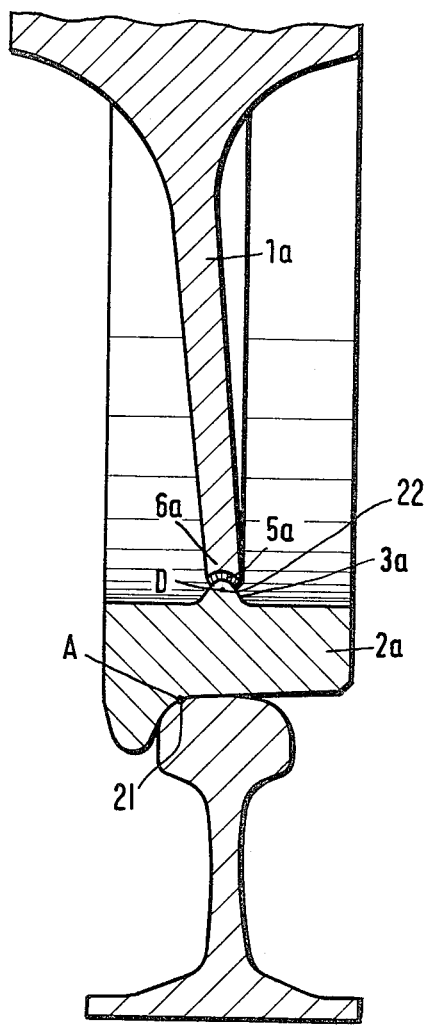
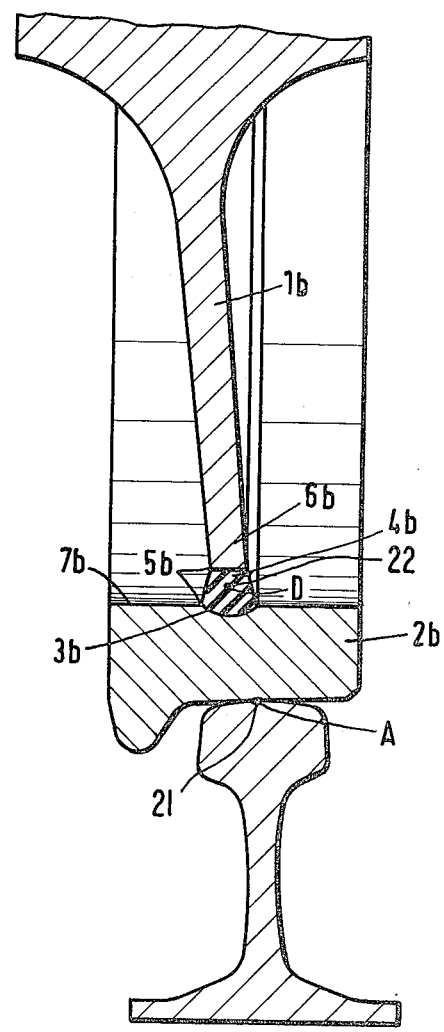

RAILWAY CAR WHEEL

The present invention relates to a wheel for rail vehicles with at least one disc connected to an axle, and with a wheel rim surrounding said disc. Heretofore known wheels of the above mentioned type consist of a metallic material and are rigidly designed. Their wheel discs and their rim are connected to a shaft of a wheel set in a torsion-resistant manner. As a result thereof, the right hand and left hand wheel disc during the running of the wheel will turn at the same angular speed whereby the driving behavior of a rail vehicle equipped with wheels of the above mentioned type is affected. The driving behavior of such equipped vehicle is furthermore dependent among other things on the design of the wheel rim profile. Rims with a cylindrical running surface due to a rolling radius of the same magnitude will bring about a unilateral engagement of the wheel flange or rim and in view of the unsatisfactory wearing behavior have not been adopted in practice. Flat profiles (for instance the known profile 1:20/1:40) will in conformity with the respectively effective rolling radius bring about a periodical turning movement of the wheel set in the track passage which turning movement is designed as sine movement. When these profiles are new and not worn, they will even at higher speeds of up to 200 km/h and therebeyond have a stable running behavior. However, they are expensive as to servicing because after only a relatively short period of operation they are greatly worn.

Anti-wear profiles for instance the known profiles of German railway and other European rail systems) wear substantially uniformly over their entire contact zone with the rail. The contour of a new and of a worn profile are of such a shape that when placed one upon the other they nearly cover each other. These surfacing of profiles adapted to encounter wear do not require the customary so-called profile correction customary with other profiles, according to which after a relatively short running period the original condition of the profile has to be restored by a chip removing operation. Therefore, these profiles are not economical for the maintenance of rail vehicles.

The dynamic behavior of wheel sets with anti-wear profile is nearly independent of the running period and is satisfactory within the speed range below about 160 km/h. At high speeds, however, considerable drawbacks are encountered. With increasing speed, the turning movement of the wheel set in the track passage is accelerated in view of quickly increasing differences of the effective rolling diameter as it is characteristic for anti-wear profiles. In other words, the sine curve is in view of shorter turning intervals reduced so that the wheel set and the entire bogie will carry out uncontrolled movements in the track passage. The wheel set may in this connection be subjected to such high forces that maintaining the gauge or staying in the track of the vehicle may be damaged with the result that the track may be damaged.

In an endeavor to counteract these uncontrolled movements of the wheel set, it has been suggested between the bogie and the vehicle box to insert mechanical or hydraulic devices which will interfere with such turning movements, in other words turning or stabilizing devices. These devices for interfering with the turning movements will prevent fast movements of the bogie about its turning pivot, however they interfere with the driving comfort of the passengers in such rail vehicle, inasmuch as they convey relatively strong oscillations and noises into the passenger compartment.

Furthermore, wheels have become known which for purposes of reducing radial shocks, have a certain elasticity between the wheel and the rail. This elasticity is obtained by a resilient arrangement of the discs. These discs may consist for instance of metallic and elastic material such as rubber, or may have a special shape. For purposes of avoiding changes in the gauge of the wheel set, these wheels are stiff in axial direction.

All features provided with regard to the development of wheel rim profiles in conformity with the preceding remarks based on the endeavor to maintain the contact geometry precisely defined and to establish the osculating conditions between wheel profile and rail profile so as to be able to reproduce these conditions.

Surprisingly, it has been found that the running behavior of railroad wheel sets with anti-wear profile can be greatly improved in contrast to heretofore known findings, when the wheel rim is enabled relative to the wheel disc and thus also relative to the rail, to carry out rotary movements about an imaginary axis parallel to the rails.

It is, therefore, an object of the present invention to so design rail vehicle wheels with surfacing or profile adapted to encounter wear that the cost for the devices which are intended in the track passage to prevent an unstable movement will not be encountered at present traveling speeds up to 200 km/h, whereas at higher speeds such unstable running will be reduced.

These and other objects and advantages of the invention will appear more clearly from the following specification in connection with the accompanying drawings, in which:

FIG. 1 illustrates a radial section through a wheel according to the invention which is supported by a rail.

FIGS. 2–5 respectively illustrate further embodiments of a wheel according to the invention in an illustration similar to that of FIG. 1, but on a larger scale than that of FIG. 1.

The device according to the present invention is characterized primarily in that the rim at least in the region of its rail contacting point is rotatable on the disc about an axis located substantially in the driving direction.

Referring now to the drawings in detail and FIG. 1 thereof in particular, FIG. 1 illustrates a wheel which comprises a rigid metal disc 1 and a rim 2 including a tread or surface which surrounds disc 1 and is provided with an anti-wear profile. The disc and the rims are pivotally connected to each other. The disc has a convex end 6 which forms the ball element of the ball joint connection. By means of the end 6, the disc rests in a trough-shaped depression 3 on the inside 7 of the rim in a positive manner, which depression forms the socket for the ball element. Between the end 6 of disc 1 and the depression 3 there is provided a layer 5 which, for absorbing radial shocks and for purposes of avoiding noise due to the friction of the parts of the joint relative to each other and also for avoiding fretting corrosion, may consist of a metallic material and/or a lubricant. As metallic material may be used sprayed-on metal powder or sinter bronze. As an example for a lubricant in this connection may be mentioned molybdenum disulfide, tetrafluoroethylene, or graphite. This layer additionally prevents the wear to which the parts of the joint are exposed in view of a movement relative to each other.

The layer 5 may be fixedly connected to the disc or to the rim, e.g. by bonding, welding, or soldering.

If now during the running operation of the wheel, the resultant of the momentary values of horizontal and vertical forces will not at the same time pass through the turning point D within the region of the free end 6 of disc 1 and through the momentary rail contacting point A lying in a tread, periphery or surface of the rim 2 on the tread or track 9 of a rail 10 of FIG. 1 also showing a wheel axis X. The rim 2 is able within a region 13 adjacent to the rail contacting point A of interengagement between the wheel tread or surface of rim 2 and the running surface on rail 10 to turn in the direction of the arrow P about the axis 22 of the wheel or disc 1 which axis 22 is located in the driving direction of the pertaining vehicle and comprises the pivot point D of disc 1. At the same time, the rim 2 turns about an axis 23 which passes through the rail contacting point A and extends parallel to the axis through the pivot point D.

The embodiment of FIG. 2 substantially corresponds to the embodiment of FIG. 1 with the difference that the joint is formed by a concave end 6a of disc 1a which forms the socket of the joint and is furthermore formed by a pertaining projection 3a of the rim 2a which projection 3a forms the pertaining ball of the ball joint. The parts of the ball joint likewise engage each other under or through the interposition of a dampening and/or lubricating layer 5a.

With the wheel according to FIG. 3, the pivotal connection between the disc 1b and the rim 2b is formed by a member 4b of elastic material as for instance rubber or high molecular polyethylene. The member 4b is located in a depression 3b on the inside 7b of the rim and a correspondingly designed free end 6b of the disc 1b while therebetween a dampening and/or lubricating layer 5b is interposed. The layer 5b may be connected between the disc and the member 4b or between the member 4b and the rim and to the oppositely located outer surface of the member 4b, so that the member 4b will form a bearing part for the ball of the ball joint.

Figure 4:
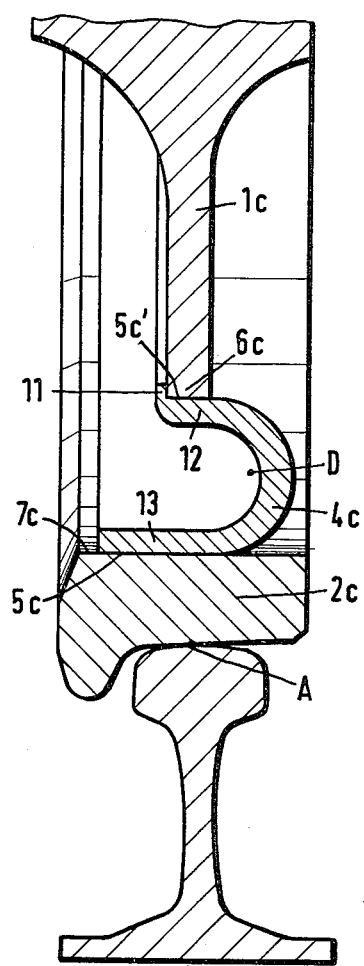

The disc 1c according to FIG. 4 has a shorter radial extension than the discs 1-1b. Disc 1c is at its radial outer end 6c positively e.g. by shrinking on, connected to a resiliently designed member 4c. The member 4c may also by welding or in any other suitable manner safely be arranged between the disc and the rim. In the specific showing of FIG. 4, the member 4c has about a C-shaped cross section with an end 11 bent off at a right angle. The end 11 extends in radial direction and together with the pertaining leg 12 of the member 4c forms a shoulder for engagement with the free end 6c of disc 1c. The other leg 13 of the member 4c rests in axial direction of the wheel over a large surface on the inside 7c of the rim 2c. The member 4c is, under the interposition of a layer 5c and 5c', resting against the end 6c of the disc and on the rim 2c, of which at least the layer 5c' is firmly connected with the disc and the member 6c, e.g. by an adhesive, by welding or by soldering. The member 6c preferably consists of a metal piece which is produced by cold rolling and in view of its described shape is resilient in axial as well as in radial direction. The member 6c may have a different cross sectional thickness so that a form elasticity in certain regions is greater than in other regions.

The member 6c may be later connected to already present rigid wheels, if a corresponding end piece is separated from the disc.

Figure 5:
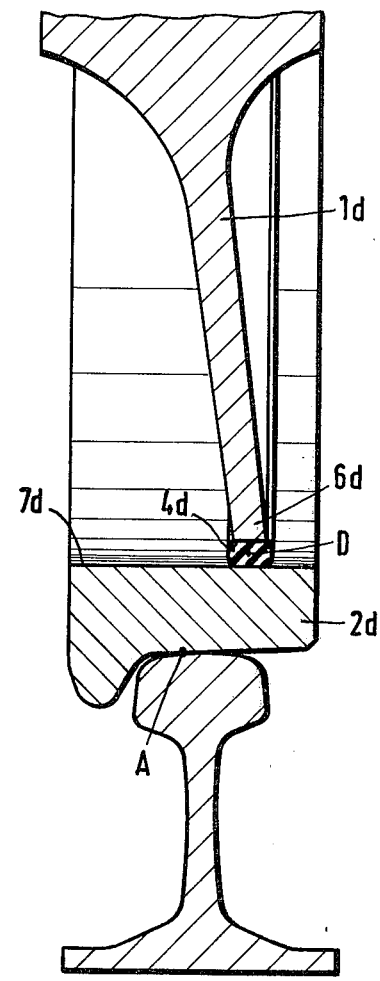

According to the embodiment of FIG. 5, the disc 1d, similar to that of FIG. 3, has a plane end face to which a member 4d of elastic material is connected. The member 4d has its longitudinal side resting against the end face of the free end 6d of the disc 1d and eccentrically with regard to the rim 2d on the inner side 7d.

The free surfaces arch in a barrel-shaped manner toward the outside. The axis comprising the pivot point D is in this connection located eccentrically with regard to the rim. The rotary movement of the disc relative to the rim is with the embodiments of FIGS. 3-5 made possible either by the compressibility of the elastic member 4b and 4d or by the resilient property of the member 4c. With the member 4c or when the disc represents one single piece and is resiliently designed, the rim region of the member 4c together with the rim connected thereto is rotatable about an imaginary point D which is located inwardly or outwardly of the disc and which may be located eccentrically with regard to the rim. The said point D is among other things dependent on the shape of the member 4c.

As will be evident from the above, due to the design according to the invention, the rim can always turn or carry out a pendulum movement when the resultant of the momentary values of the horizontal and vertical forces do not simultaneously pass through the pivot point of the rim and the momentary rail contacting point of the rim on the track. Within low speed ranges below the limit speed, there occurs a damping effect which is considerable in comparison to rigid wheels, and at speeds which are higher than the limit speeds, the self excitement of the oscillating system is considerably less than with a rigid wheel.

In order at high driving speed to assure running safety, it is not necessary with the design according to the invention to provide expensive and great structural changes on the vehicle or the damping and turning interfering devices between the vehicle box and the bogie.

It is, of course, to be understood that the present invention is, by no means, limited to the specific showing in the drawings, but also comprises any modifications within the scope of the appended claims.

What I claim is:

1. A wheel arranged for movement substantially longitudinally along a rail and having a rotational axis therewith which includes in combination: at least one disc of said wheel rotatable about said axis, and a wheel rim having a tread surrounding said disc, said disc having said wheel rim universally mounted therewith, said tread having contacting points for engaging the rail, said rim at least within the region of said contacting points being journalled rotatably relative to said disc about the axis located at least substantially in the direction of movement of said wheel, and means effecting lubrication between said rim and said disc to supplement dampening for rolling and irregular oscillating motion during universal movement both transversely and longitudinally therewith.

2. A wheel in combination according to claim 1, in which a turning point for movement of said rim about said disc is located eccentrically with regard to said rim.

3. A wheel in combination according to claim 1, in which said disc and said rim are pivotally interconnected in the manner of a ball and socket joint.

4. A wheel in combination according to claim 3, in which an outer peripheral portion of said disc forms a socket, and in which an inner surface of said rim has a portion journalled in said socket in the manner of a ball.

5. A wheel in combination according to claim 3, in which an inner side of said rim forms a socket, and in which an outer periphery of said disc is journalled in said socket in the manner of a ball.

6. A wheel arranged for movement substantially longitudinally along a rail and having a rotational axis therewith which includes in combination: at least one disc of said wheel rotatable about said axis, and a wheel rim having a tread surrounding said disc, said disc having said wheel rim universally mounted therewith, said tread having contacting points for engaging the rail, said rim at least within the region of said contacting points being journalled rotatably relative to said disc about the axis located at least substantially in the direction of movement of said wheel, and spring means between said rim and said disc to supplement dampening for rolling and irregular oscillating motion during universal movement both transversely and longitudinally therewith.

7. A wheel in combination according to claim 6, which includes an intermediate elastic rubber spring element interposed between and connected to one of said rim and said disc.

8. A wheel in combination according to claim 7, in which said elastic element is eccentrically located with regard to said rim.

9. A wheel in combination according to claim 7, in which said elastic element is a resilient disc.

10. A wheel in combination according to claim 7, in which said elastic element is rigidly connected to the free end of said disc.

11. A wheel in combination according to claim 7, in which said elastic element is rigidly connected to said rim.

12. A wheel in combination according to claim 7, in which at least one sliding layer is provided between pairing of the rim and disc and alternately said intermediate elastic element and forms a unit with one of said three parts.

13. A wheel in combination according to claim 7, in which at least one damping layer is provided between two of said parts and forms a unit with one of said three parts.

* * * * *